United States Patent [19]

Gupta

[11] Patent Number: 5,258,871
[45] Date of Patent: Nov. 2, 1993

[54] DUAL DIFFRACTION GRATING BEAM SPLITTER

[75] Inventor: Mool Gupta, Webster, N.Y.

[73] Assignee: Eastman Kodak Company, Rochester, N.Y.

[21] Appl. No.: 891,001

[22] Filed: Jun. 1, 1992

[51] Int. Cl.$^5$ .......................... G02B 5/18; G02B 5/30; G02B 27/28; G02B 27/44
[52] U.S. Cl. .................................. 359/485; 359/566; 359/569; 359/576
[58] Field of Search .................. 359/15, 488, 566, 569, 359/571, 576, 485

[56] References Cited

U.S. PATENT DOCUMENTS

| | | | |
|---|---|---|---|
| 3,504,606 | 4/1970 | Macovski | 359/566 |
| 3,585,286 | 6/1971 | Macovski | 359/576 |
| 3,910,683 | 10/1975 | Nishino et al. | 359/576 |
| 4,458,980 | 7/1984 | Ohki et al. | |
| 4,665,310 | 5/1987 | Heemskerk | |
| 4,672,187 | 6/1987 | Fujita et al. | |
| 4,733,065 | 3/1988 | Hoshi et al. | |
| 4,765,724 | 8/1988 | Huichun | 359/576 |
| 4,868,803 | 9/1989 | Sunagawa et al. | |
| 4,873,678 | 10/1989 | Nakamura et al. | |
| 4,945,525 | 7/1990 | Yamamoto et al. | |
| 4,993,789 | 2/1991 | Biles et al. | 359/488 |
| 5,013,107 | 5/1991 | Biles | 359/15 |
| 5,029,154 | 7/1991 | Sumi et al. | |
| 5,093,749 | 3/1992 | Maeda | 359/571 |
| 5,155,622 | 10/1992 | Kawatsuki et al. | 359/566 |

Primary Examiner—Martin Lerner
Attorney, Agent, or Firm—William W. Holloway

[57] ABSTRACT

A dual diffraction grating useful in optical disk heads comprises first and second light diffracting surfaces of identical pitch and depth, wherein the diffraction grooves of the first and second diffraction surfaces are angularly oriented with respect to one another. Incident light beams are diffracted into first and second components with the first components being TM polarized components and the second components being TE polarized components. Upon emerging from the dual diffraction grating, the first and second components diverge with respect to one another because the first component is substantially transmitted through the diffraction grating without diffraction while the second component is diffracted. The initial diffraction by the first grating causes the TE component to diverge away from the TM component while the second diffraction grating diffracts the TE component back toward the TM component so as to diverge therefrom by only a slight angle of, for example, about 0.1° to 3.0°. In use, the two components emerging from the dual diffraction grating are focussed on photodetectors to develop reproduction signals and tracking and focus error signals. In a preferred embodiment, the first diffraction grating is etched in a first substrate, and the second diffraction grating is etched on a second substrate. The first and second substrates are then bonded to one another with a layer of optical adhesive. The two gratings are displaced by 0.1°–5° with respect to each other.

24 Claims, 4 Drawing Sheets

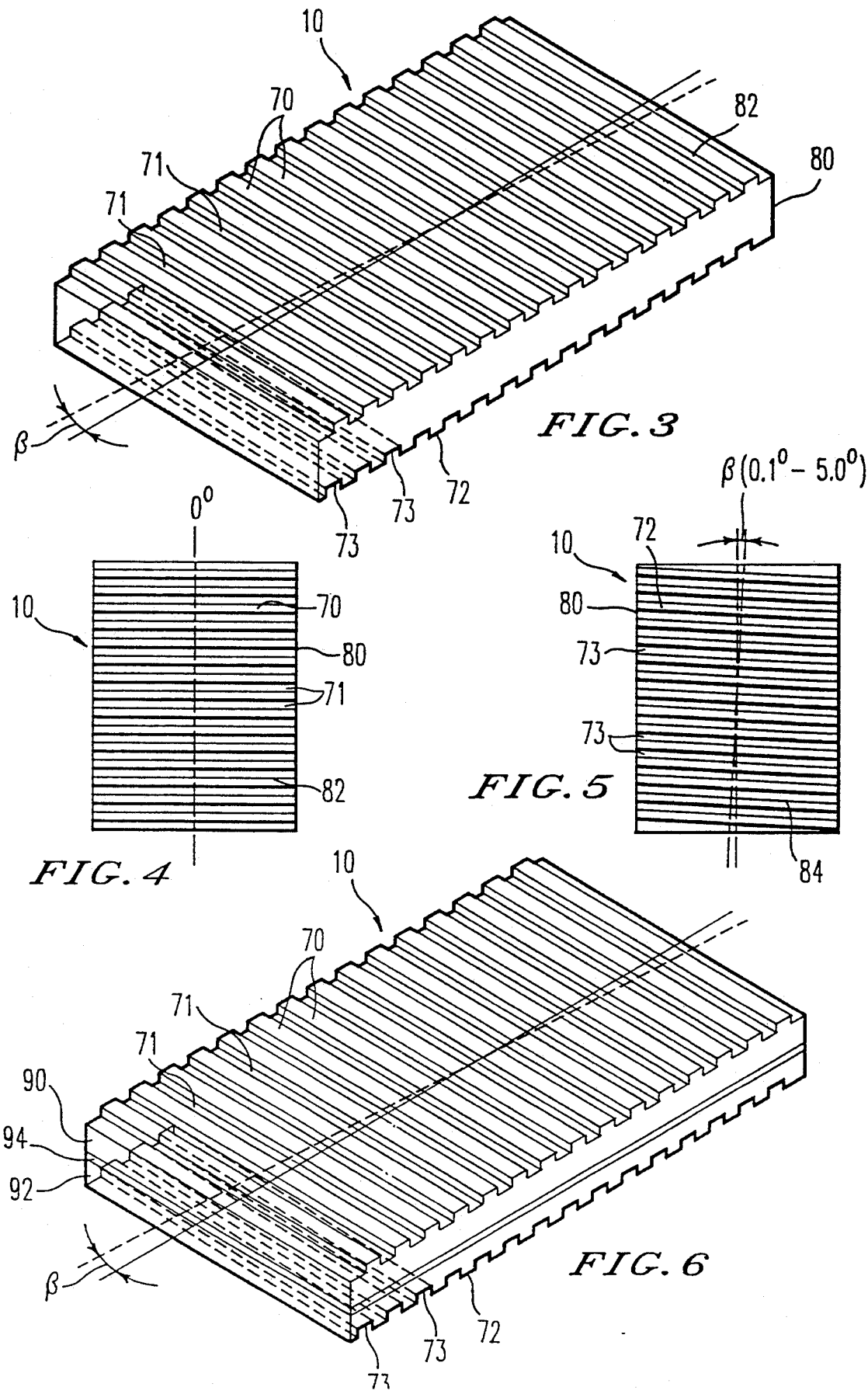

DUAL DIFFRACTION GRATING BEAM SPLITTER

FIELD OF THE INVENTION

The present invention relates to polarization beam splitters using dual diffraction gratings, and more particularly, the instant invention relates to such beam splitters useful in optical disk heads where light reflected from an optical recording medium, such as a write once, erasable or read only optical disk is polarized for various purposes.

BACKGROUND ART

In general, in order to reduce access time of an optical disk apparatus, it is important to reduce the size and weight of optical heads. In conventional systems, a track signal, a focus signal and a rf (high frequency) signal are detected by individual optical systems which require a plurality of optical parts with a corresponding complexity of structure. The complicated structure both increases the weight of the optical head and the access time. Attempts have been made at reducing the size and weight of optical pick-ups by utilizing high-density gratings; however, with high-density gratings, the angle of diffracted light tends to deviate due to fluctuations in the wavelength of laser light emanating from the semiconductor laser. In addition, it is necessary to space two photosensor elements, one for detecting a focusing signal and the other for detecting a track signal, apart from one another by a large distance, which leads to difficulty in assembly and adjustment, and which increases the size of the device.

An approach to this problem is to utilize an optical head which employs a dual diffraction grating for separating light reflected from the optical disk to perform the light signal detecting function. Exemplary of this approach is the disclosure of U.S. Pat. No. 5,029,154 to Sumi et al., in which a quartz substrate has diffraction gratings etched on opposite sides thereof. Sumi et al. is in contrast to approaches such as that of U.S. Pat. No. 4,945,525, in which two separate diffraction gratings in spaced relation to one another are used to separate a beam of coherent light into first and second components, such as TE and TM components, for use in generating tracking error, focusing error and information signals.

While U.S. Pat. No. 5,029,154 discloses the concept of a dual-diffraction grating, the light beams are separated by utilizing gratings of different pitch or different geometrical configuration. Moreover, in Sumi et al., the gratings are on opposite sides of a single substrate. Once one side of a substrate has been etched to provide a first grating, it is extremely difficult to protect the first grating while fabricating the second grating. Moreover, with the approach of Sumi et al., it is necessary to insert a focusing lens between the double grating and the beam reflected from the optical disk, which introduces astigmatism in the optical beam which results in crosstalk between the focusing and tracking signals.

In view of the Sumi et al. structure, and the difficulties associated therewith, there is a need for improvement in and alternative approaches to the dual diffraction grating concept.

SUMMARY OF THE INVENTION

It is an object of the present invention to provide a new and improved dual-diffraction grating useful in apparatus such as optical disk heads.

In view of this object, and other objects, the instant invention contemplates a polarization device formed on substrate material for splitting a light beam into first and second components. The polarization device comprises a first grating of a pitch selected to substantially diffract the first component by a first diffraction angle and to substantially transmit the second component, and a second grating of a pitch equal to the selected pitch of the first grating. The second grating is spaced from the first grating and rotated with respect thereto by an angle sufficient to cause the first and second components to emerge from the grating at a relatively small angle with respect to one another. In accordance with one embodiment of the instant invention, the first and second gratings are fabricated on opposite sides of a single sheet of substrate material, and in accordance with another embodiment of the invention, the first and second gratings are fabricated on separate substrates which are then superimposed with the gratings facing in opposite directions or in some cases facing each other. In the second embodiment, the gratings may be bonded to one another with a layer of optical adhesive.

In accordance with more specific aspects of the invention, the first component of the light beam is a transverse electrical (TM) component and the second component is a transverse magnetic (TE) component, the pitch of the gratings being sufficient to substantially diffract the TE component while substantially transmitting the TM component. The instant invention further contemplates a method for fabricating a dual-diffraction grating on separate substrates and a method of polarizing light with a dual diffraction grating by angularly displacing one substrate with respect to the other.

BRIEF DESCRIPTION OF THE DRAWINGS

Various other objects, features and attendant advantages of the present invention will be more fully appreciated as the same becomes better understood when considered in conjunction with the accompanying drawing, in which like reference characters designate the same or similar parts throughout the several views, and wherein:

FIG. 3 is a perspective view of a dual-diffraction grating configured in accordance with the principles of the instant invention;

FIG. 4 is a top view of the diffraction grating of FIG. 3;

FIG. 5 is a bottom view of the diffraction grating of FIG. 3;

FIG. 6 is a perspective view taken from one side of a preferred embodiment of the diffraction grating configured in accordance with the principles of the instant invention;

DETAILED DESCRIPTION OF THE PREFERRED EMBODIMENTS

Figure 1:
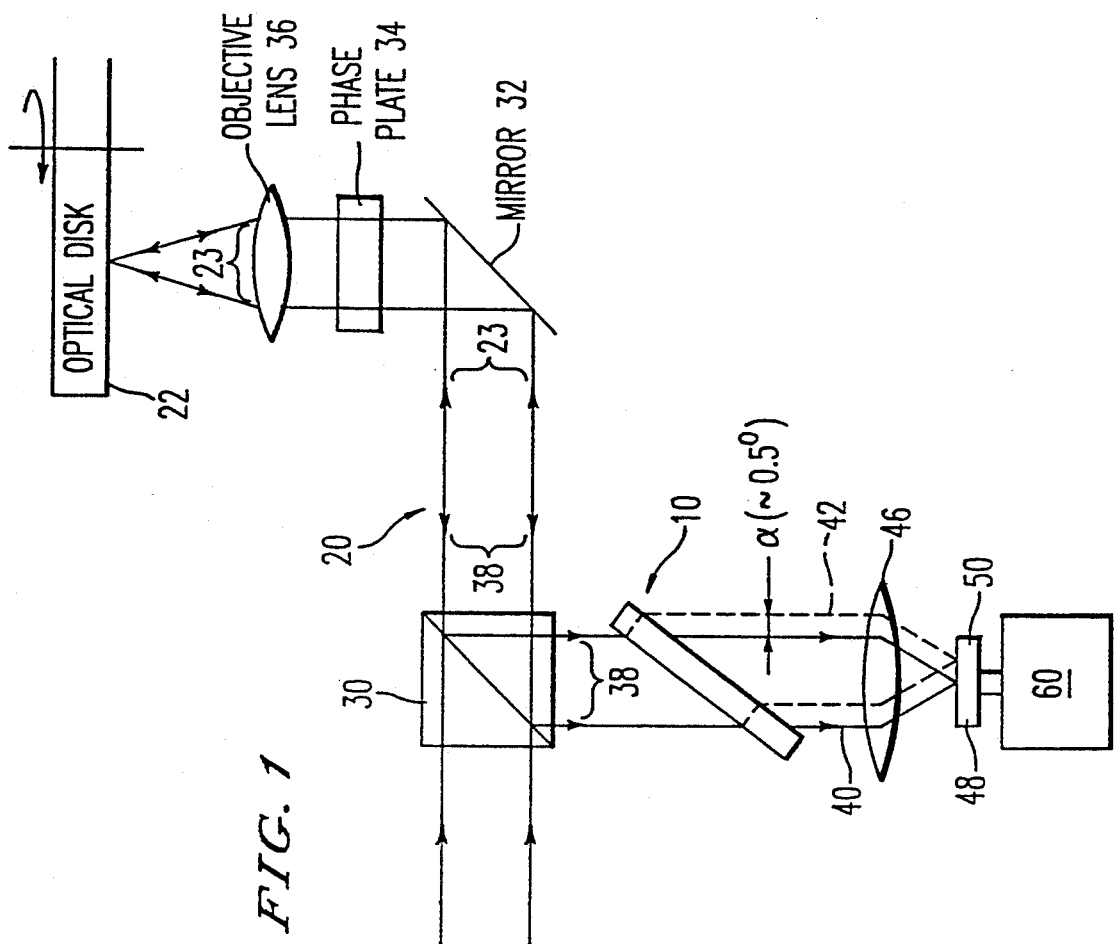
FIG. 1 is a schematic illustration showing how the dual-diffraction grating of the present invention might be employed in an optical disk reading system.

Referring now to FIG. 1, there is show a dual diffraction grating, designated generally by the numeral 10, configured in accordance with the principles of the instant invention and employed in one example of an optical system, designated generally by the numeral 20. Optical systems of configuration other than that of an optical system may utilize the dual diffraction grating 10 of the instant invention. The optical system 20 reads an optical disk 22 with a beam 23 of coherent light from a laser 24. The beam of collimated coherent light 23 is transmitted through a grating plate 26 and and passes through a polarizing beam splitter 30. The coherent light beam 23 is then reflected from a mirror 32 and passes through a phase plate 34 and an objective lens 36 which sharply focuses the beam of coherent light on the optical disk 22. The beam of coherent light 23 is reflected back from the optical disk 22 as a return beam 38 which passes back through the objective lens 36 and phase plate 34 and is then reflected by the mirror 32 back into the beam splitter 30 which directs the return beam into the dual diffraction grating 10 configured in accordance with the principles of the instant invention.

The dual diffraction grating beam splitter 10 splits the return beam 38 into first and second polarized components 40 and 42 which are focussed by an objective lens 46 onto photodetectors 48 and 50, respectively. The photodetectors 48 and 50 convert the optical information in the first and second polarized components 40 and 42 into electrical signals which are further processed by electrical circuitry 60 which provides a reproduction signal analogous to the information on the optical disk 22 as well as tracking and focussing error signals for controlling the system 20 by, for example, adjusting the position of the objective lens 36.

It is important to minimize the size and weight of the optical head incorporating the various elements of the system 20. To this end, it is desirable to keep the photodetectors 48 and 50 in close proximity with one another while maintaining separation between the first and second polarized components 40 and 42 of the return light beam 38. The angle $\alpha$ between the first and second polarized components 40 and 42 may be in the range of about 0.1° to about 3.0°. A preferred range is about 0.3° to 1.0° with a preferred single value of about 0.5°. The dual diffraction grating 10, configured in accordance with the principles of the instant invention, accomplishes this in accordance with the principles diagrammatically set forth in FIG. 2.

Figure 2:
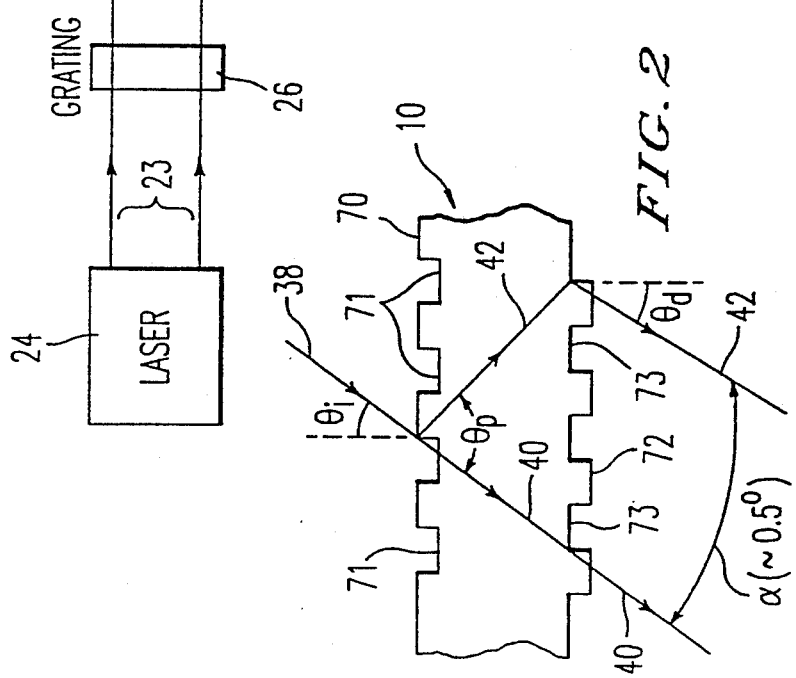
FIG. 2 is a schematic side view illustrating the principles of the instant invention.

Referring now to FIG. 2, the return beam 38, which for purposes of discussion with respect to the dual diffraction grating 10, is also referred to as the incident beam 38, approaches the dual diffraction grating at an angle of incidence $\Theta_i$ and is polarized by a first diffraction grating 70 comprised of straight diffraction grooves 71 into the first and second polarized components 40 and 42 which are at a polarization angle $\Theta_p$ with respect to one another. This is because the first polarized component 40 is substantially transmitted by the first diffraction grating 70 while the second polarized component 42 is diffracted. The polarization angle $\Theta_p$ is relatively large which would mean if the single surface 70 were used as the diffraction grating in the system of FIG. 1, the photodetectors 48 and 50 would necessarily be spaced a considerable distance from one another which is antithetical to the desirable concept of having the photodetectors as close to one another as possible and practical. In order to decrease the angle between the first and second polarized components 40 and 42, a second diffraction grating 72 comprised of straight diffraction grooves 73 is disposed parallel to and spaced from the first diffraction grating 70. The second diffraction grating 72 substantially transmits the first polarized component 40 but diffracts the second polarized component 42 by an angle $\Theta d$ more toward the first polarized component. Preferably, the angle $\Theta d$ is slightly less than the angle $\Theta i$ so that the polarized components 40 and 42 diverge at an angle $\alpha$ as they emerge from the double diffraction grating 10 with the angle $\alpha$ being approximately 0.5° to 1.0°. As will be further explained hereinafter, this is accomplished in accordance with the principles of the instant invention by fabricating the second grating 72 with a pitch, depth and geometry identical to that of the first diffraction grating 70 but angularly displaced therefrom by about 0.1° to 5.0°. In other words, the second diffraction grating 72 extends in a plane parallel to the first diffraction grating 70 but is rotated or angularly offset with respect to the first diffraction grating so that the respective straight diffraction grooves 71 and 73 are not parallel.

Referring now to FIGS. 3–5, there is shown a first embodiment of the dual diffraction grating 10 wherein a single glass or quartz substrate 80 has the first diffraction grating 70 on a surface 82 thereof and the second diffraction grating 72 on a surface 84 thereof. The surfaces 82 and 84 are parallel to one another and spaced from one another. The straight diffraction grooves 73 comprising the second diffraction grating 72 are not parallel to the straight diffraction grooves 71 comprising the first diffraction grating 70 but are angularly displaced by the angle $\beta$ with respect to the first diffraction grooves. In accordance with preferred practice, the angle $\beta$ is relatively small, within the range of 0.1° to 5.0°.

Referring now to FIG. 6, where a preferred embodiment of the double diffraction grating configured in accordance with the principles of the instant invention is illustrated, it is seen that the preferred embodiment utilizes a pair of glass or quartz substrates 90 and 92 bonded together by a layer of optical adhesive 94 which is light cured. The substrate 90 has the straight diffraction grooves 71 of the first diffraction grating 70 etched therein while the substrate 92 has the diffraction grooves 73 of the second diffraction grating 72 etched thereon. As with the diffraction grating 10 in the first embodiment of FIGS. 3–5, the grooves 73 are not parallel with the grooves 71 but are angularly offset by the angle $\beta$ in the range of 0.1° to 5.0°. With the exception of being fabricated of the two substrates 90 and 91 bonded together by the adhesive layer 94, the preferred embodiment of the dual diffraction grating 10 is substantially identical to the embodiment of FIGS. 3–5.

The reason that the embodiment of FIG. 6 is preferred is because with the embodiments of FIGS. 3–5 it is difficult not to damage the first diffraction grating 70 while fabricating the second diffraction grating 72. This is because with the embodiment of FIGS. 3–5, it is necessary to first etch the grooves 71 and then turn the substrate 80 over to etch the groove 73 on the opposite side. While the grooves 73 are being etched, grooves 71 tend to become degraded resulting in a dual diffraction grating 10 which is defective.

In fabricating the dual diffraction grating 10 of the preferred embodiment shown in FIG. 6, the grooves 71 are etched in the substrate 90 while the grooves 73 are etched in the substrate 92. The substrate 90 and the substrate 92 are then rotated with respect to one another and bonded at the angle β (about 0.1° to 5.0°). Since the substrates 90 and 92 are etched separately, etching of the grooves 73 does not effect previously etched grooves 71.

In accordance with a specific embodiment of a double diffraction grating 10 illustrated in FIG. 6, the double diffraction grating is configured to split incident light beam 38 into first and second optical components 40 and 42, wherein the first optical component is a transverse magnetic (TM) component and the second optical component a transverse electric (TE) component wherein the components are polarized in directions perpendicular to one another. For an incident light beam 38 having a wavelength of 0.633 μm, the selected grating pitch is about 0.36 μm if the diffraction grooves 71 and 73 have a depth of about 0.68 μm. The substrate material is quartz having a refractive index of about 1.46.

The gratings 70 and 72 are formed separately by etching the straight diffraction grooves 71 and 73 therein utilizing a holographic technique in which a layer of photoresist, about 0.22 μm thick, is coated onto the substrates 90 and 92 and then exposed to a HeCd laser beam having a wavelength of 0.4416 μm with interference fringes spaced 0.36 μm apart. The exposed straight grating patterns on the surfaces of the substrates 90 and 92 are then developed utilizing conventional in situ monitoring techniques and the relief patterns forming the grooves 71 and 73 are transferred to the substrates by reactive beam ion etching, to a depth of 0.68 μm. The layer of optical adhesive 94 is then applied between the substrates 90 and 92 and the substrate angularly displaced by the angle β. The diffraction gratings 70 and 72 may either face away from or in some cases toward one another. In the preferred embodiment, the diffraction gratings face away from one another. The optical adhesive 94 is then cured by exposure to light in order to bond the substrates 90 and 92 together at the angle β. Substrates 90 and 92 have a thickness of ½ to 1 mil., while the optical adhesive layer 94 has a thickness in the range of 1 to 50 μm with the preferable range of 10-20 μm. While these ranges for the optical adhesive layer 94 are preferred, other thicknesses may be appropriate. Norland TM optical adhesive is a preferred adhesive.

By bonding the two substrates 90 and 92 together, no shift in beam position occurs due to source wavelength function. Consequently, dual diffraction gratings 10 of the preferred embodiment can be used for various tracking and focus-sensing mechanisms, such as mechanisms used for beam position detecting methods and those used for astigmatic focus error methods.

Figure 7:
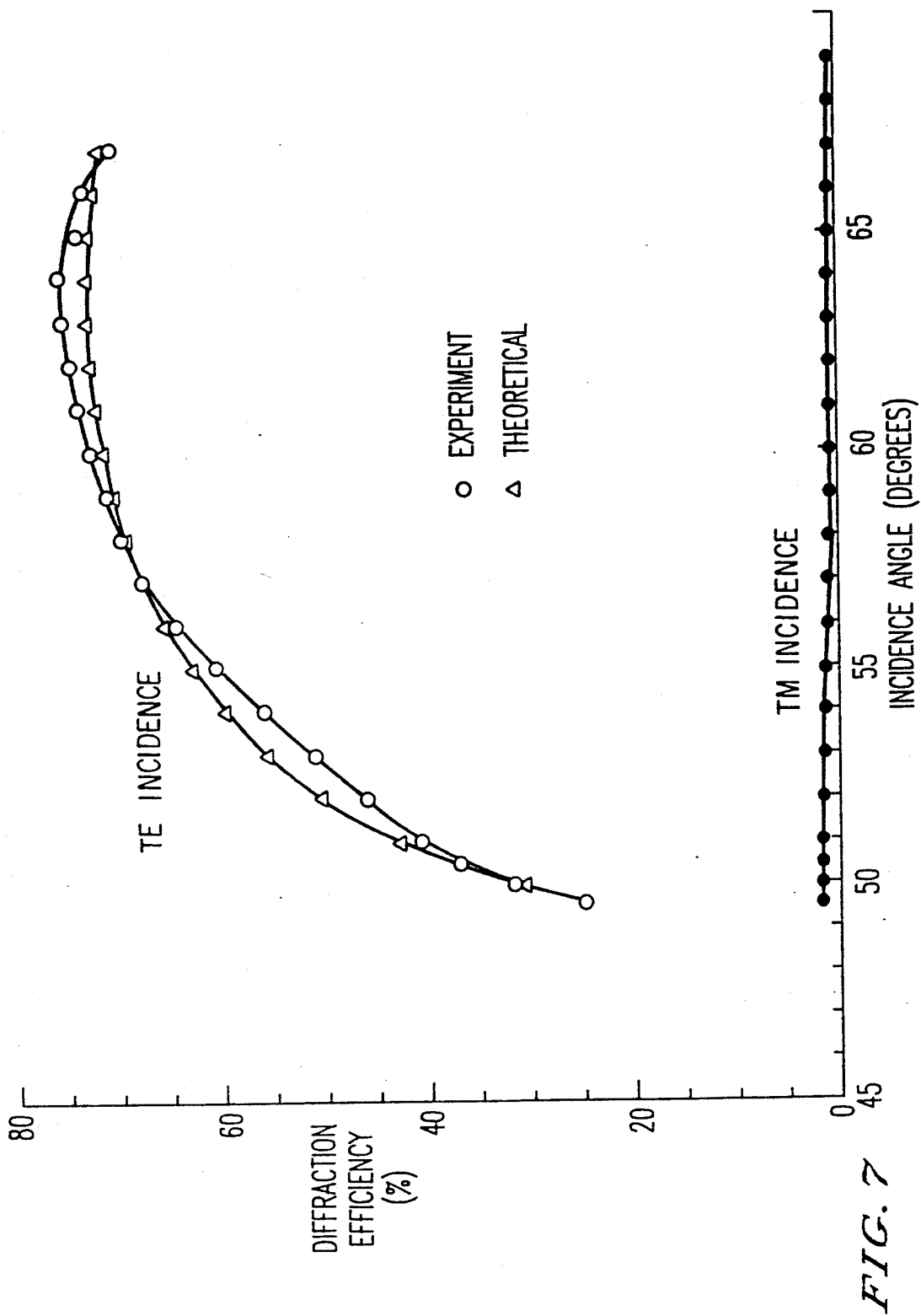
FIG. 7 is a graphical presentation plotting diffraction efficiency as a function of incidence angle.
Figure 8:
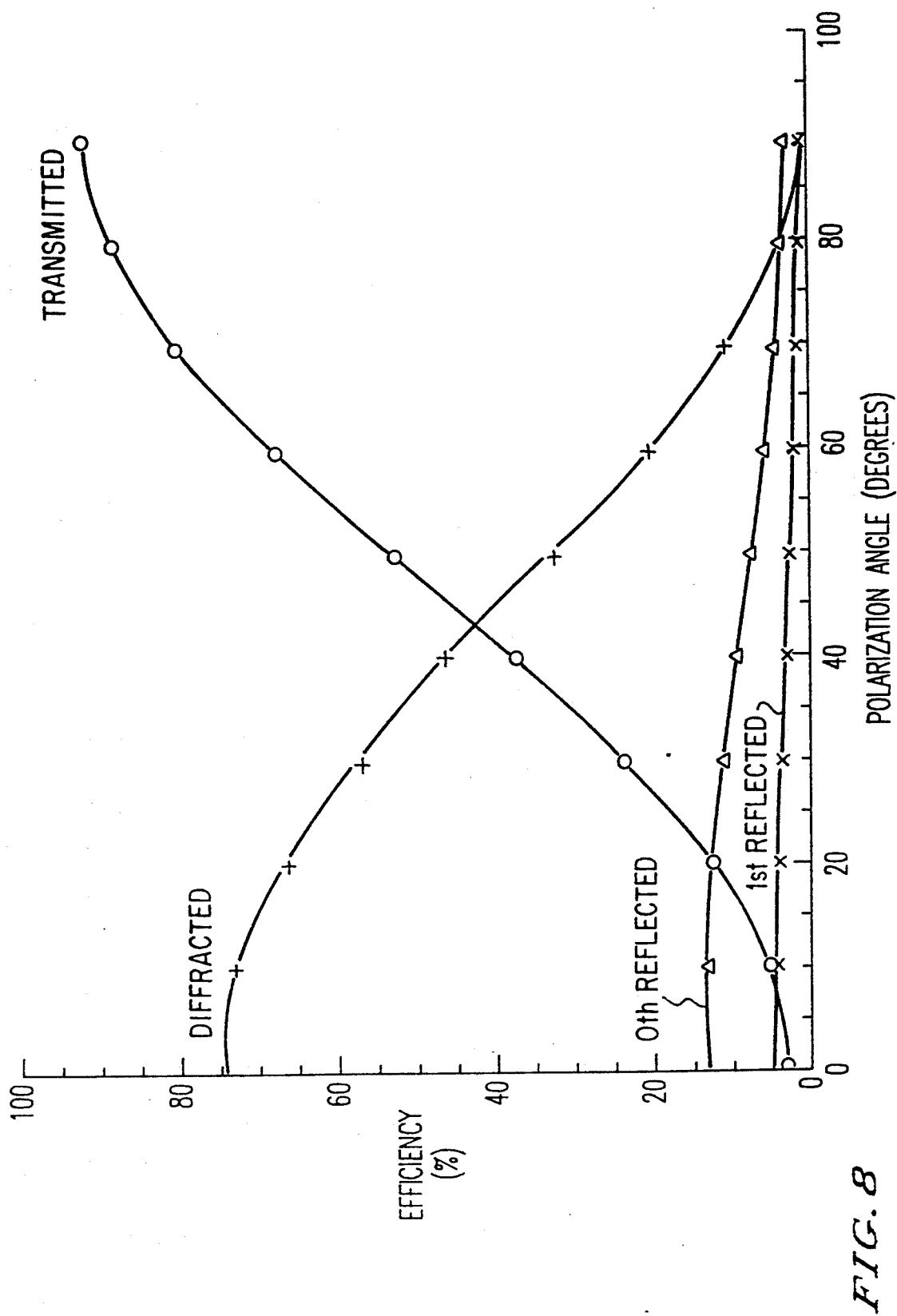
FIG. 8 is a graphical illustration plotting diffraction efficiency as a function of polarization angle.

Referring now to FIGS. 7 and 8 in conjunction with FIGS. 1 and 2, it is seen that the incident beam 38 approaches the dual diffraction grating 10 at an angle $\Theta i$ with respect being perpendicular. In FIG. 7, the diffraction efficiency of the above described dual diffraction grating 10 is plotted as a function of the incidence angle $\Theta i$ with the incident beam 38 of coherent light having a wavelength of 0.6328 micrometers. As is seen in FIG. 7, the experimental and theoretical points for the TE incidence beam which is the second polarized component 42 are tracked quite closely and show a steep increase in diffraction efficiency as the incidence angle increases from about 50° to about 65°, reaching almost 80%.

While the diffraction efficiency or TE incidence rises in this range, the diffraction efficiency for TM incidence which is very low to begin with, decreases to less than 1% as the incidence angle increases. It is quite evident that dual diffraction grating 10 transmits the TM component (the first component 40) while substantially diffracting the TE component (the second component 42).

As is seen in FIG. 8, where diffraction efficiency is illustrated as a function of polarization angle, it is seen that for polarization angle 45°, the diffraction efficiency for TM polarized light and TE polarized light is substantially the same, i.e., 45°; however, as the polarization angle diverges from 45°, the diffraction efficiency for TE and TM components diverges. It is apparent from the curves of FIGS. 7 and 8 that there is a very high diffraction efficiency for TE polarized light and essentially no diffraction efficiency for TM polarized light. Consequently, the incident beam 38 on each of the diffraction gratings 70 and 72 of the dual diffraction grating 10 accomplishes polarization separation as one state of polarization is diffracted and the other state of polarization is transmitted.

While the foregoing example is specific to a coherent light beam having a wavelength of 0.6328 micrometers, similar results with coherent light beams of other wavelengths are within the scope of the invention as long as the dual diffraction grating 10 is configured with the first and second diffraction gratings 70 and 72 having pitch and groove depth parameters so as to substantially transmit the first polarized component 40 of the incident light beam 38 while diffracting the second polarized component 42 of the incident light beam.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

From the foregoing description, one skilled in the art can easily ascertain the essential characteristics of this invention and without departing from the spirit and scope thereof, can make various changes and modifications of the invention to adapt it to various usages and conditions.

What is claimed is:

1. A dual diffraction grating formed on substrate material for splitting an incident light beam into first and second polarized components, the dual diffraction grating comprising:

a first grating on a first surface of the substrate material, the first grating having a pitch selected to substantially transmit the first component of the incident light beam and to produce the second component by diffracting the incident light beam to propagate through the substrate material at a first angle with respect to the first component; and a second grating of a selected pitch spaced from the first grating, being overlain thereby and extending parallel thereto, the second grating being angularly displaced with respect to the first grating by an angle sufficient to cause the first and second components to emerge from the dual diffraction grating at a second angle with respect to one another which is less than the first angle.

2. The dual diffraction grating of claim 1, wherein the pitch of the second grating is equal to the pitch of the first grating.

3. The dual diffraction grating of claim 2, wherein the second angle is in the range of about 0.3° to about 1.0°.

4. The dual diffraction grating of claim 2, wherein the second angle is about 0.5°.

5. The dual diffraction grating of claim 1, wherein the diffraction gratings are formed of straight grooves.

6. The dual diffraction grating of claim 1, wherein the first component of the light beam is a TM component and the second component is a TE component, and wherein the pitches of the first and second gratings are sufficient to substantially diffract the TE component, while substantially transmitting the TM component.

7. The dual diffraction grating of claim 1, wherein the substrate material is quartz.

8. The dual diffraction grating of claim 1, wherein the first grating and second grating are formed on opposite sides of the single sheet of the substrate material.

9. The dual diffraction grating of claim 1, wherein the first grating is etched on the surface of a first substrate of the substrate material and the second grating is etched on the surface of a second substrate of the substrate material, and wherein the substrates are superimposed.

10. The dual diffraction grating of claim 9, wherein the substrates are bonded to one another with a layer of optical adhesive.

11. The dual diffraction grating of claim 10, wherein the first component of the light beam is a TM component and the second component of the light beam is a TE component, and wherein the pitch of the gratings is sufficient to substantially refract the TE component, while substantially transmitting the TM component.

12. The dual diffraction grating of claim 11, wherein the substrate material is quartz having a refraction index of about 1.46 and wherein the light beam is a coherent light beam having a wavelength of about 0.63 micrometers, wherein the selective grating pitch is about 0.36 micrometers, and wherein the gratings have a depth of about 0.68 micrometers.

13. The dual diffraction grating of claim 12, wherein the second grating is angularly displaced by about 0.1° to 5° with respect to the first grating.

14. The dual diffraction grating of claim 13, wherein the incident light beam has an angle of incidence with respect to perpendicular of the first grating which is in the range of 55° to 70°.

15. The dual diffraction grating of claim 14, wherein the substrate material is ½ to 1 mm thick and wherein the optical adhesive is in the range of 1 to 50 micrometers thick.

16. The process for fabricating a dual diffraction grating useful for substantially transmitting a first component of an incident beam and diffracting a second component of the incident beam comprising the steps of:

forming on a first substrate a diffraction grating of a selected pitch;

forming on a second substrate a diffraction grating having a selected pitch which in conjunction with the selected pitch of the first diffraction grating diffracts the second component to emerge from the dual diffraction grating at a small angle with respect to the first component;

bonding the first and second substrates together with the diffraction gratings facing in opposite directions and with the second diffraction grating extending parallel to but being angularly offset with respect to the first diffraction grating.

17. The process of claim 16, wherein the selected pitch of the second diffraction grating equals the selected pitch of the first diffraction grating.

18. The process of claim 17, wherein the substrates are quartz having a thickness in the range of ½ to 1 mm.

19. The process of claim 16, wherein the diffraction gratings are formed by etching grooves into the surfaces of the first and second substrates.

20. The process of claim 18, wherein the substrates are bonded together with a layer of clear optical adhesive having a thickness in the range of 1–50 micrometers.

21. The process of claim 18, wherein the grooves are delineated on the substrates prior to etching by exposing a photoresist with interference fringes from beams of coherent laser light.

22. A method of producing first and second polarized components of a coherent light beam incident upon a dual diffraction grating having first and second diffraction gratings of straight grooves, comprising the steps of:

transmitting the first component through the first and second diffraction gratings without diffracting the first component;

diffracting the second component with the first diffraction grating at a first angle with respect to the first component, and diffracting the second component with the second grating so that the second component emerges from the dual diffraction grating at a second angle with respect to the first component which is substantially less than the first angle, wherein the second diffraction grating is formed of straight grooves which are angularly displaced from the straight grooves of the first diffraction grating.

23. The process of claim 22, wherein the first component is a TM component and the second component is a TE component.

24. The process of claim 22, wherein the first and second diffraction gratings have equal pitches and equal groove depths.

* * * * *